Oct. 2, 1956  E. W. BARKSDALE  2,764,815
HIGH SPEED DENTAL ENGINES
Filed March 2, 1955  2 Sheets-Sheet 1
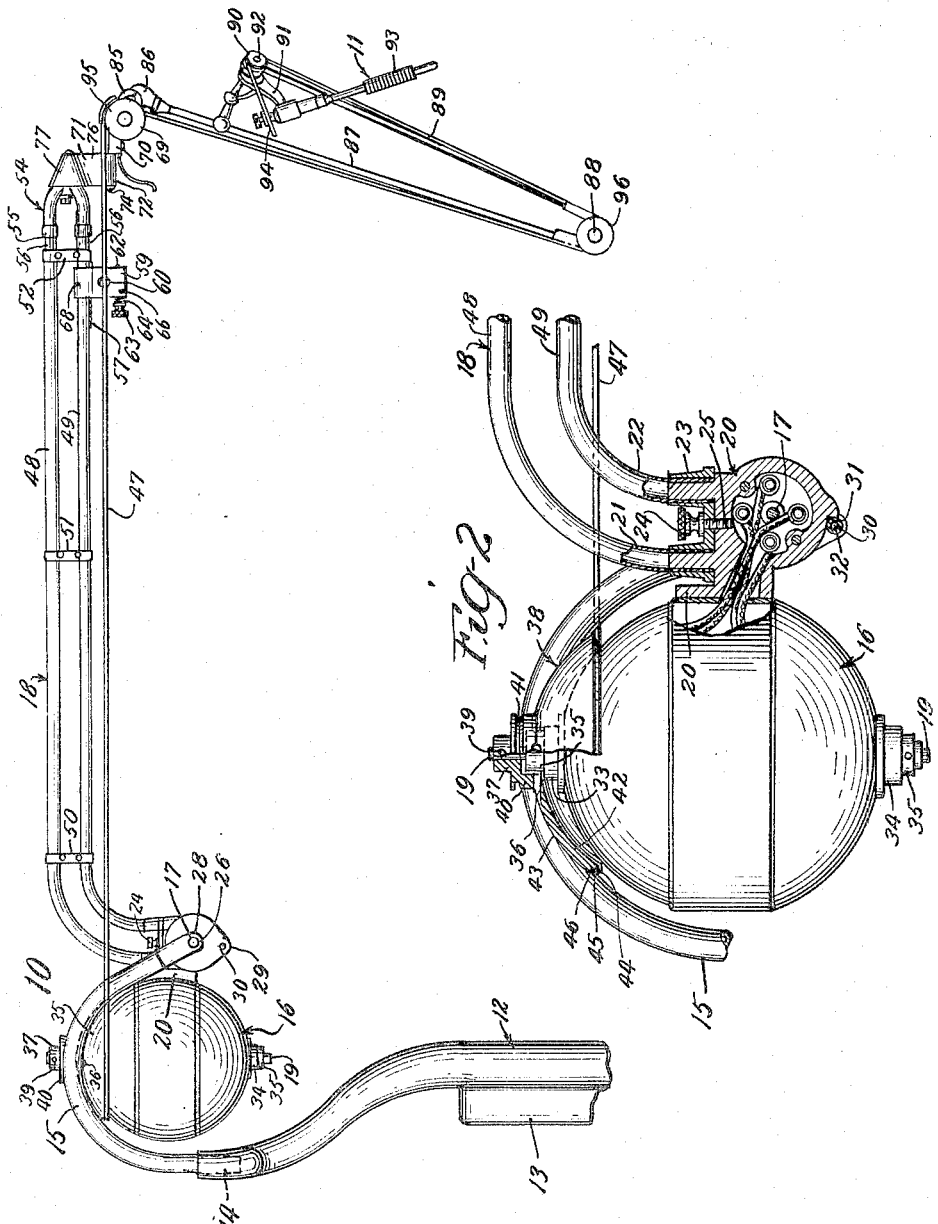
INVENTOR.
Edgar W. Barksdale
BY
Robert W. Jeudt
Atty.

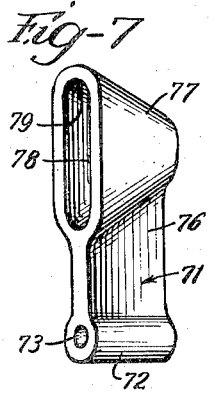
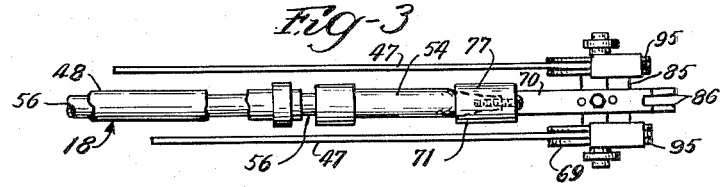
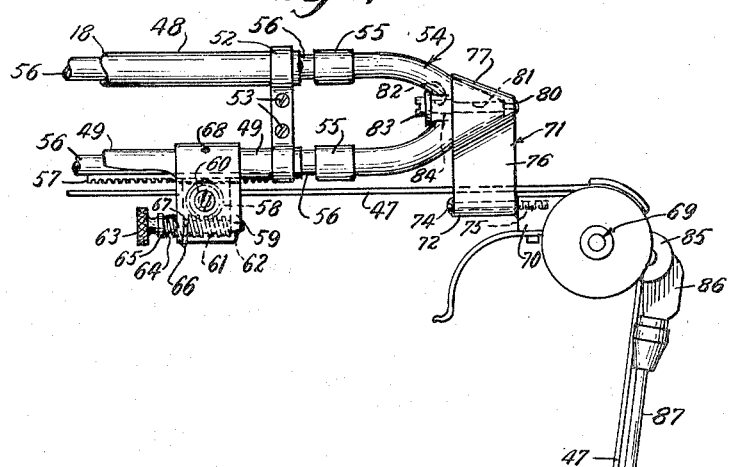
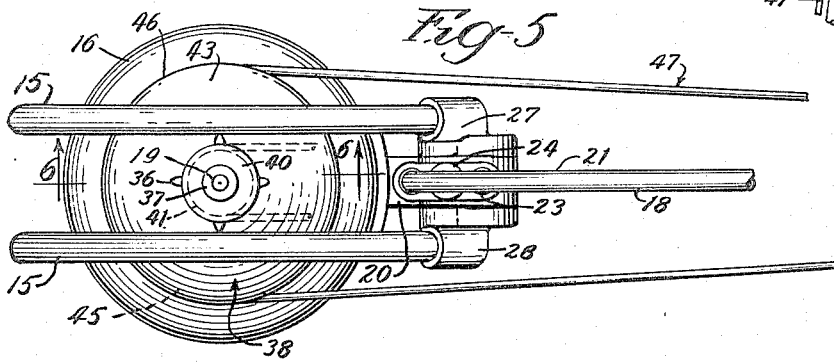
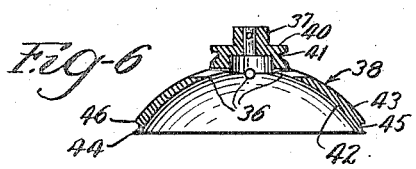

United States Patent Office 2,764,815
Patented Oct. 2, 1956

2,764,815

HIGH SPEED DENTAL ENGINES

Edgar W. Barksdale, Montezuma, Ga.

Application March 2, 1955, Serial No. 491,708

8 Claims. (Cl. 32—23)

The present invention relates to high speed dental engines, and is particularly concerned with dental engine assemblies which are adapted to meet the requirements of high speed operation of hand pieces.

One of the objects of the invention is the provision of an improved motor assembly including an electric motor having a drive shaft and a pulley carried by the outer end of the drive shaft that is adapted to locate the stress on the shaft between its two bearings instead of placing the stress on the shaft outwardly of both bearings.

Another object of the invention is the provision of an improved driving motor assembly by means of which the speed of drive of the hand piece may be increased to as much as 16,000 R. P. M. at the bur or other tool.

Another object of the invention is the provision of an improved driving motor assembly which is adapted to utilize the dental engines of the prior art, many of which are already owned by dentists, by providing auxiliary equipment for increasing the speed of drive of the hand piece and maintaining operative mechanical connections between the motor and hand piece with the addition of a minimum amount of mechanism.

Another object of the invention is the provision of an improved motor assembly including a high speed, hollow driving pulley which receives the end of the motor and is tapered outside to clear the gooseneck and provided with a belt groove of a suitable diameter and location to cause the belt to be driven at high speed, while clearing the gooseneck.

Another object of the invention is the provision of improved drive pulley arrangements for high speed dental engines in which provision is made for oil holes for oiling the motor, while still maintaining the dynamic balance of the pulley.

Another object of the invention is the provision of improved high speed driving mechanism for dental engines and supporting equipment by means of which the belt is maintained in the plane of the pulley groove and the longitudinal adjustment of the trombone arm is maintained to keep a proper tension on the belt by means of a friction spring, which puts pressure on the threads and head of the adjustment screw and prevents the adjustment of the belt tension being changed by vibration.

Other objects and advantages of the invention will be apparent from the following description and the accompanying drawings, in which similar characters of reference indicate similar parts throughout the several views.

Referring to the two sheets of drawings accompanying this specification,

Fig. 1 is a fragmentary side elevational view of a dental engine assembly, shown in connection with its supporting arm and the supporting and driving arrangements for the hand piece;

Fig. 2 is a fragmentary elevational view of the motor on a larger scale, showing the details of construction of the driving pulley and arrangements of its parts so that the belt may clear the gooseneck on the outside, when used for high speed;

Fig. 3 is a fragmentary top plan view of the end of the trombone arm and the guide pulleys provided for guiding the belt at the end of the trombone arm and for maintaining the belt in the plane of the groove of the drive pulley;

Fig. 4 is a fragmentary side elevational view of the mechanism shown in Fig. 3;

Fig. 5 is a fragmentary top plan view of the drive motor gooseneck and part of the trombone arm, which is shown in Fig. 2;

Fig. 6 is a sectional view taken through the drive pulley on the plane of the line 6—6 of Fig. 5, looking in the direction of the arrows;

Fig. 7 is a view in perspective of the pulley supporting bracket used at the end of the trombone arm;

Fig. 8 is a view in perspective of a spacing sleeve used about a stop pin on the trombone arm joint to provide adequate clearance between the drive pulley and the gooseneck.

Referring to Fig. 1, 10 indicates in its entirety the dental engine assembly arranged to drive the hand piece 11 at its usual speed or selectively at a higher speed, which may, for example, be as much as 16,000 R. P. M.

The assembly is supported upon a vertically extending arm or bracket 12, which may be attached to the wall at 13, or which may be mounted upon the column of a dental unit of the type having a basin and the usual equipment required by dentists.

At its upper end the column 12 may have a socket for rotatably supporting the depending end portion 14 of a forked gooseneck, which comprises a pair of substantially U shaped metal members 15, which extend upward over the drive motor 16 and downward on the other side of the motor to the shaft 17, which supports the trombone arm 18.

The two gooseneck members 15 are spread far enough to provide space for the usual small pulley which is mounted on the motor shaft 19 (Fig. 5), to which it is pinned. In the devices of the prior art the small pulley was provided with a belt located between the gooseneck arms 15.

The present driving attachments are particularly adapted to be used on the "Ritter" type of dental engine assembly to transform it into a system which may be operated by both low and high speeds.

The motor 16 is mounted on a metal bracket 20 projecting forwardly and having the downwardly curved end portions 21 and 22 of the trombone arm 18 secured to a double tubular fixture 23, which in turn is secured to the bracket 20 by a screw bolt 24 in a threaded bore 25.

The bracket 20 is pivotally mounted on the shaft 17, which is carried in a pair of apertures 26 in the ends of the goosenecks 15; and the weight of the motor 16 counter-balances the trombone arm and all other equipment mounted thereon. The arm may be pivoted upward out of the way of the dentist, in which case the motor 16 would move downward from the position of Fig. 1, holding the trombone arm and the other equipment in an upper position.

The bracket 20 is mounted between a pair of gooseneck fixtures 27, 28, which may be round, as seen in elevation in Fig. 1, except for a lateral extension 29, where a transverse pin 30 is provided for acting as a stop against a shoulder 31 on the fixture 20.

In order to provide some clearance between the motor pulley and the goosenecks a metal sleeve 32, such as shown in Fig. 8, is mounted on the pin 31, preventing the trombone arm from pivoting in a clockwise direction quite as far as it does in the ordinary "Ritter" engine.

The motor 16 has its hubs 33 and 34 at each end provided with shaft bearings 35, 35. The bearings 35, 35 are provided with apertures for oiling the bearings, the lower one of which is accessible; but the upper one is under the pulley 38. Therefore, the pulley 38 is provided with a diametrically extending pair of apertures 36, either one of which may register with the oil aperture in the bearings to permit the upper bearing to the oiled. There being two apertures 36 in the pulley, this takes an equal amount of metal from both sides of the axis and maintains the dynamic balance of the pulley.

The shaft 19 is rotatably mounted in the bearings and projects from the upper end sufficiently to mount the hub 37 of a drive pulley 38 of the type shown in Fig. 6. This drive pulley has it hub provided with a bore fitting on the shaft 19 and with a transverse pin 39 securing the pulley to the shaft.

Below the hub 37 in Fig. 2 the pulley is provided with a cylindrical enlargement 40 having a tapered pulley groove 41 extending about its periphery and the pulley groove has a rounded bottom and a substantially straight wall on its upper side in Fig. 2, but a frusto-conical wall on its lower side.

From the cylindrical portion 40 of the pulley the drive pulley 38 is hollow, being partially spherical on its inner surface 42 and partially spherical on its outer surface 43. The purpose of the partially spherical cavity 42 is to receive the housing of the motor 16 and to locate the rim of the bell shaped pulley so that its diameter is laterally outside the two goosenecks 15 at such a spread and elevation that the belt will clear the goosenecks.

The purpose of the outer partially spherical or tapered shape of the pulley is to enable it to clear the goosenecks and to permit the motor with the pulley to pivot up between the goosenecks to the position of Fig. 1, where the trombone arm 18 is in its usual horizontal position, supported by the stop 31 and pin 30, with the pulley clearing the goosenecks.

At is lower edge the pulley 38 is provided with a pointed rim 44, which is one of the lateral borders of a laterally facing rounded pulley groove 45, having a second relatively sharp edge 46 extending peripherally about the pulley to provide the upper border for the groove.

The groove 45 is thus located in the rim of pulley 38 downwardly of the end of the motor shaft so that any lateral strain on the shaft is impressed upon it between its ends instead of having its strain entirely on the end of the shaft.

The diameter of the pulley groove is such, as shown in Fig. 5, that the belt 47, going around the pulley groove, is located outwardly of the motor and outwardly of the goosenecks and all other parts of the assembly so that it may run freely.

The trombone arm 18 comprises a pair of parallel tubular members 48 and 49, which are held in spaced relation by sheet metal clamps 50, 51, 52 at regularly spaced points, these clamps being of the type shown in Fig. 4, where the two clamping members are drawn together by screw bolts 53, clamping the cylindrical portions of the clamps on the tubes.

The end of the trombone arm comprises a U shaped tubular member 54 provided with surrounding sleeves 55 at its ends, which sleeves carry smaller telescoping tubes 56, 56 slidably mounted in the tubes 48 and 49 for extension of the trombone arm. One of the inner tubes 56 has a longitudinally extending screw rack 57 secured to it and adapted to engage the teeth of a screw gear 58, which is rotatably mounted on the gear housing 59 by screw bolt 60.

The screw gear 58 is driven by a screw 61, which has its ends 62 mounted in bearings in the gear housing 59; and the screw 61 has a projecting shaft provided with a knurled thumb screw 63. The thumb screw 63 has a helical coil spring 64 would about its shank and frictionally engaging under the annular flange 65.

The spring 64 is compressed between the annular flange 65 and the gear housing 59 and has a projecting hook shaped extension 66 which hooks about the gear housing 59 and has its end turned into an aperture 67 to anchor it. The gear housing 59 is clamped on the lower tube 49 and secured by a through pin 68, which prevents the gear housing from rotating or sliding on the tube 49.

When the knob 63 is rotated, the screw 61 drives the screw gear 58, which in turn drives the rack 57 and moves the trombone end fixture 54 back and forth, the inner tubes 56 sliding in the larger tubes 48 and 49. This is for the purpose of providing a proper tension on the belt 47 and for taking up the slack.

In the engines of the prior art, having a small pulley, the guide pulley assembly 69 had its supporting frame 70 secured by a bolt to the yoke of the trombone end fixture 54.

Since the belt 47 is now located about the groove 45 in the large pulley 38, below the top of the motor, the guide pulley assembly 69 must have the upper surfaces of its grooves located so that the belt 47 may extend parallel to the trombone arm 18 so that the guide pulleys may guide the belt into engagement with the groove 45 and prevent the belt from jumping out of the pulley groove 45.

For this purpose I provide the trombone arm end fixture 54 with a new pulley spacing bracket assembly, which is shown in perspective in Fig. 7. This bracket 71 has a cylindrical lower portion 72 with a through bore 73 adapted to receive the screw bolt 74 (Fig. 4) which passes through the bore 73 and is threaded into a threaded socket 75 in the pulley bracket 70.

The screw bolt 74 is driven home in its socket 75, leaving a clearance between the bracket 71 and the head of the screw bolt so that the bracket 70 may pivot freely with the bolt 74 in the through bore 73.

The bracket 71 has a relatively thin trapezodial web 76 integrally joined to an upper triangular body 77, which is wider than the web, being thick enough to provide for an elongated oval socket 78 in the larger end of the body 77.

The socket 78 is actually a rounded groove at its bottom 79 and at both ends so that it fits on the curved end of the trombone arm fixture 54, where it is secured by a through bolt 80 located in bore 81 and passing through hole 82 in the trombone arm fixture, where it is secured by a screw bolt 83 threaded into the enlarged portion 84 of bolt 80.

The socket 78 with its curved surface 79 so fits on the end of the trombone that it is prevented from rotating, though secured by a single screw bolt.

The web then depends from the trombone arm, holding the screw bolt 74 at the proper level to support the belt 47 on the guide pulley assembly 69 in such position that the belt is parallel with the trombone arm and guided straight towards the larger groove 49 of the pulley.

The bracket 70 has an extension 85 for pivotally mounting the end fixture 86 of the arm 87, which is again jointed at the center 88, where there is pivotally mounted a second arm 89 carrying the guide pulleys 90 at its end.

The wrist joint 91 is pivotally mounted at 92 on the axis of the latter pulleys; and the wrist joint rotatably supports the housing 93 of the hand piece 11, the drive shaft of which is provided with a pulley 94 for receiving the bolt. Guide pulleys 95 are provided on each side of the bracket extension of the bracket 70; and guide pulleys 96 are provided on each side of the pivot shaft 88; and all of these guide pulleys are mounted on ball or roller bearings and provided with peripheral grooves for the belt.

The belt 47 is endless, passing around the hand piece pulley 94, while two portions of the belt pass over the two pulleys 90. The two belt portions then pass over the two pulleys 96 and upward over the two pulleys 95 and backward, parallel to the trombone arm, around the groove 45 of the large pulley 38.

The trombone arm is extended until the belt is suitably tightened to drive without slipping, by adjusting the knob 63 of the worm screw 61.

With the belt in the position shown in Fig. 1, the motor which formerly drove the small pulley of the "Ritter" engine at such speed that the pulley rotated 5100 R. P. M. when it was spinning free, with the load which is placed upon it when the belt is on the large pulley, the large pulley rotates at 3500 R. P. M., driving the hand piece at 16,000 R. P. M.

I desire it to be understood that various sizes of pulleys may be used to drive the hand piece shaft at various speeds; but the present arrangement is adapted to drive burs at such a high speed that the time of drilling is greatly reduced, the heating is reduced, the cutting is expedited with diamond burs, and the trauma is greatly reduced or substantially eliminated.

When it is desired to place the belt on the smaller pulley, the trombone arm is shortened and the belt loosened enough to be passed down around the motor 16 and brought upward from the pulleys 25 above the trombone arm to the smaller pulley groove 41. In this position the belt does not extend parallel to the trombone arm or pulley groove; but the angle is such with respect to the pulley groove that the belt is maintained in the groove because of the small diameter of the pulley, which, incidentally, is slightly larger than the usual pulley, giving an increase of twenty-five percent in speed with the small pulley.

The operation of the mechanism is as follows: All of the pivotal arrangements and counter-balance of the trombone arm and other arms are maintained; and the belt is now located below the trombone arm and outside of the goosenecks around the groove of the larger pulley, which drives the shaft of the hand piece at a greatly increased speed, making the assembly a high speed dental engine assembly, which operates the hand piece at about 16,000 R. P. M.

The guide pulleys being downwardly spaced from the trombone arm they guide the belt along a line parallel to the larger pulley groove and maintain the tension and alignment of the belt, even at the higher speeds accomplished.

The higher speeds enable the dentist to save his time and that of the patient, to work on the teeth with greater facility and ease, and to form the cavities or other formations on the teeth with a minimum amount of time and a minimum amount of discomfort to the patient.

The trombone arm is adapted to maintain its extended adjustment, which is not changed by vibration; and the motor may be oiled as usual through the holes in the pulley which, being oppositely located, maintain the dynamic balance of the pulley.

The location of the larger pulley groove downwardly toward the body of the motor, places the lateral strain on the motor shaft between the bearings of the motor and permits the motor to pivot upward with its smaller pulley between the gaskets in the same manner as it formerly did with a small pulley.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An improved pulley for a high speed dental engine, comprising a metal member provided with a hub having a bore for receiving a motor shaft and means for securing the hub to shaft, the said member being provided with an integral circular enlargement carried by said hub, and having a belt groove in its periphery, forming a small driving pulley, said enlargement being provided with a counterbore adapted to clear parts carried by the driving motor about the adjacent end of the shaft, said member having a downwardly and outwardly extending integral metal wall provided at its lower lateral edge with a belt groove for receiving the driving belt of a dental hand piece, and driving it at a higher speed, the said wall being concavely curved on its inside for receiving the adjacent part of the driving motor with a clearance, and the said wall being tapered upwardly on its outside for clearing the gooseneck arms of a support, the said wall being partially spherical on the inside and on the outside, and the said wall having a through aperture extending diametrically through two opposite wall portions symmetrically to maintain the dynamic balance of said member, while providing an aperture for oiling the motor bearing.

2. A guide pulley supporting bracket for dental engine trombone arms, comprising a metal member provided at one end with a substantially triangular body, which is round at one end of the body and oval at the other end, and having a through aperture, said oval end being formed with a cavity adapted to receive the tubular U-shaped end of a trombone arm with a substantial fit to prevent rotation of the bracket on the arm, said bracket having a web extending from said body, and said web supporting a second body portion provided with a parallel through bore for receiving and supporting the pivot bolt of guide pulleys to be carried by the end of the trombone arm.

3. A trombone arm adjustment comprising a pair of parallel tubes and a U-shaped tubular member having parallel legs slidably mounted in said tubes, one of said legs having a laterally projecting rack for driving by a screw gear, a supporting housing on one of the first-mentioned parallel tubes about said rack, and having a rotatable screw gear mounted therein, a driving screw and shaft in said housing engaging said screw gear, and having an actuating head and a spring anchor on said housing and helically wound about said shaft, and frictionally engaging inside said head for holding the screw gear shaft in adjusted position against vibration.

4. In a high speed dental engine assembly, the combination of a support with a pair of substantially U-shaped gooseneck arms spaced from each other and provided with a shaft spaced from said support, a motor supporting fixture pivotally mounted on said shaft and carrying a drive motor having a vertically extending shaft, said fixture also carrying an upwardly and outwardly extending arm for supporting guide pulleys and a dental hand piece, a plurality of auxiliary arms carried by said first-mentioned arm and pivoted to each other and supporting a dental hand piece at the end thereof, with guide pulleys at each pivot between said arms, a small driven pulley carried by the hand piece on a driven shaft, a large bell shaped pulley carried by said motor shaft and located between and under said gooseneck arms, and an endless belt extending about said bell pulley outside said gooseneck arms and about said guide pulleys and hand piece pulley to drive the hand piece shaft at a high rotative speed for effecting quicker operations with the hand piece, said belt being located below and parallel to said outwardly extending arm and extending over guide pulleys located below the end of said outwardly extending arm, said outwardly extending arm having a downwardly extending fixed bracket on its end and provided with a pivot bolt pivotally supporting trunnions for said latter guide pulleys.

5. In a high speed dental engine assembly, the combination of a support with a pair of substantially U shaped gooseneck arms spaced from each other and provided with a shaft spaced from said support, a motor supporting fixture pivotally mounted on said shaft and carrying a drive motor having a vertically extending shaft, said fixture also carrying an upwardly and outwardly extending arm for supporting guide pulleys and a dental hand piece, a plurality of auxiliary arms carried by said first-mentioned arm and pivoted to each other and supporting a dental hand piece at the end thereof, with guide pulleys at each pivot between said arms, a small driven pulley carried by the hand piece on a driven shaft, a large bell shaped pulley carried by said motor shaft and located between and under said gooseneck arms, and an endless belt extending about said bell pulley outside said gooseneck arms and about said guide pulleys and hand piece pulley to drive the hand piece shaft at a high rotative speed for effecting quicker operations with the hand piece, said belt being located below and parallel to said outwardly extending arm and extending over guide pulleys located below the end of said outwardly extending arm, said outwardly extending arm having a downwardly extending fixed bracket on its end and provided with a pivot bolt pivotally supporting trunnions for said latter guide pulleys, said bracket being carried by an end part slidably mounted on said outwardly extending arm.

6. In a high speed dental engine assembly, the combination of a support with a pair of substantially U shaped gooseneck arms spaced from each other and provided with a shaft spaced from said support, a motor supporting fixture pivotally mounted on said shaft and carrying a drive motor having a vertically extending shaft, said fixture also carrying an upwardly and outwardly extending arm for supporting guide pulleys and a dental hand piece, a plurality of auxiliary arms carried by said first-mentioned arm and pivoted to each other and supporting a dental hand piece at the end thereof, with guide pulleys at each pivot between said arms, a small driven pulley carried by the hand piece on a driven shaft, a large bell shaped pulley carried by said motor shaft and located between and under said gooseneck arms, and an endless belt extending about said bell pulley outside said gooseneck arms and about said guide pulleys and hand piece pulley to drive the hand piece shaft at a high rotative speed for effecting quicker operations with the hand piece, said belt being located below and parallel to said outwardly extending arm and extending over guide pulleys located below the end of said outwardly extending arm, said outwardly extending arm having a downwardly extending fixed bracket on its end and provided with a pivot bolt pivotally supporting trunnions for said latter guide pulleys, said bracket being carried by an end part slidably mounted on said outwardly extending arm, and said arm having a rack, worn gear, and worm adjustment for said slidably mounted part, and spring means for imposing friction on said adjustment to prevent its moving under vibration.

7. A high speed dental engine assembly comprising a support, a pair of gooseneck arms mounted on said support, and having a transverse pivot shaft at one end of said arms, a drive motor and an enlarged drive pulley carried by the motor shaft, a trombone arm having a pivot fixture pivotally mounted on said pivot shaft and fixedly secured to the housing of said driving motor, said driving motor moving pivotally with said trombone arm from an upper diagonal position to a lower substantially horizontal position, guide pulleys and auxiliary arms carried by said trombone arm, and carrying a dental hand piece having a driven pulley, an endless belt extending over said guide pulleys and driven pulley, and extending backward along to said trombone arm about said enlarged pulley, said enlarged pulley having an outwardly convex and inwardly concave shape, nesting with but spaced from the driving motor, and having no hub on its inside, to permit the pulley to extend about the motor housing and below and beyond the lateral extent of said gooseneck arms, where said enlarged pulley has a peripheral groove receiving said belt and supporting the belt outside of the gooseneck arms, said driving motor driving said dental hand piece at a high rotative speed, due to the size of said enlarged pulley.

8. A high speed dental engine assembly comprising a support, a pair of gooseneck arms mounted on said support, and having a transverse pivot shaft at one end of said arms, a trombone arm having a pivot fixture pivotally mounted on said shaft and fixedly secured to the housing of a driving motor, said driving motor moving pivotally with said trombone arm from an upper diagonal position to a lower substantially horizontal position, guide pulleys and auxiliary arms carried by said trombone arm, and carrying a dental hand piece having a driven pulley, an endless belt extending over said guide pulleys and driven pulley, and extending backward parallel to said trombone arm about an enlarged pulley, said enlarged pulley having a substantially bell shape, nesting with but spaced from the driving motor, and having no hub on its inside, to permit the pulley to extend about the motor housing and below and beyond the lateral extent of said gooseneck arms, where said enlarged pulley has a peripheral groove receiving said belt and supporting the belt outside of the gooseneck arms, said driving motor driving said dental hand piece at a high rotative speed, due to the size of said enlarged pulley, said enlarged pulley also having an outer small peripheral groove at its smaller end for driving the dental hand piece at normal speeds, and said trombone arm being extensible to take up the slack in the belt when the belt is applied to the latter groove.

References Cited in the file of this patent
UNITED STATES PATENTS

| | | |
|---|---|---|
| 516,465 | Berry | Mar. 13, 1894 |
| 696,545 | Browne | Apr. 1, 1902 |
| 2,133,332 | Pieper | Oct. 18, 1938 |